United States Patent
Dierks et al.

(10) Patent No.: US 8,296,924 B2
(45) Date of Patent: Oct. 30, 2012

(54) TOOL FOR PROCESSING LIGHT WAVE CONDUCTORS

(75) Inventors: Christoph Dierks, Detmold (DE); Guenther Hanning, Detmold (DE)

(73) Assignee: Weidmueller Interface GmbH & Co. KG, Detmold (DE)

( * ) Notice: Subject to any disclaimer, the term of this patent is extended or adjusted under 35 U.S.C. 154(b) by 46 days.

(21) Appl. No.: 12/795,060

(22) Filed: Jun. 7, 2010

(65) Prior Publication Data

US 2010/0313402 A1 Dec. 16, 2010

(30) Foreign Application Priority Data

Jun. 16, 2009 (DE) .................. 20 2009 004 925 U
Jul. 23, 2009 (DE) .................. 20 2009 010 038 U
Apr. 16, 2010 (DE) .................. 20 2010 005 766 U

(51) Int. Cl.
*B23P 23/00* (2006.01)
(52) U.S. Cl. .......... 29/566.4; 29/751; 7/107; 72/409.14
(58) Field of Classification Search ................ 29/283.5, 29/566.4, 751; 30/91.2, 90.1; 7/107; 72/409.1, 72/409.06, 409.14
See application file for complete search history.

(56) References Cited

U.S. PATENT DOCUMENTS

| 4,159,793 | A |   | 7/1979 | Belmonte et al. |
| 4,557,049 | A |   | 12/1985 | Cribbs |
| 5,277,051 | A | * | 1/1994 | Liu .............................. 72/409.14 |
| 5,999,682 | A |   | 12/1999 | Vincent |
| 6,230,387 | B1 |  | 5/2001 | Gritters et al. |
| 6,273,990 | B1 | * | 8/2001 | Bookbinder et al. ......... 156/714 |
| 6,892,460 | B2 | * | 5/2005 | Wilhelm et al. ................ 30/134 |
| 8,006,372 | B2 | * | 8/2011 | Caveney et al. ................ 29/751 |
| 2003/0113087 | A1 |  | 6/2003 | Lee et al. |
| 2004/0035004 | A1 |  | 2/2004 | Wilhelm et al. |
| 2005/0188468 | A1 | * | 9/2005 | Crawford .......................... 7/107 |
| 2005/0226586 | A1 |  | 10/2005 | Watte |
| 2010/0062657 | A1 | * | 3/2010 | Huang .......................... 439/676 |

FOREIGN PATENT DOCUMENTS

| DE | 19842122 A1 | 3/2000 |
| DE | 19842122 A1 | 3/2000 |
| DE | 10056780 A1 | 5/2002 |
| DE | 202006012869 U1 | 1/2008 |
| EP | 0177205 A2 | 4/1986 |
| EP | 1273939 A2 | 1/2003 |

* cited by examiner

*Primary Examiner* — Joseph J Hail
*Assistant Examiner* — Joel Crandall
(74) *Attorney, Agent, or Firm* — Lawrence E. Laubscher, Sr.; Lawrence E. Laubscher, Jr.

(57) ABSTRACT

A hand tool is operable to crimp a tubular metal contact member concentrically about the stripped end portion of an insulated fiber optic light-wave conductor in spaced relation to the free end extremity thereof. A tensioning arrangement tensions the excess portion of the conductor that extends beyond the contact member, whereupon a cutting device engages the tensioned portion of the conductor to sever cleanly the excess extremity from the conductor. The tensioning arrangement serves to deflect the conductor excess end portion obliquely outwardly relative to the longitudinal axis of the conductor. Tensioning is achieved by a deflecting disk positioned normal to the longitudinal axis of the light-wave conductor, or by a guide bore contained in a conductor guide device attached to the tool body. Preferably, two contact members are simultaneously crimped on a pair of conductors, and the excess ends of the conductors are simultaneously tensioned and severed.

15 Claims, 11 Drawing Sheets

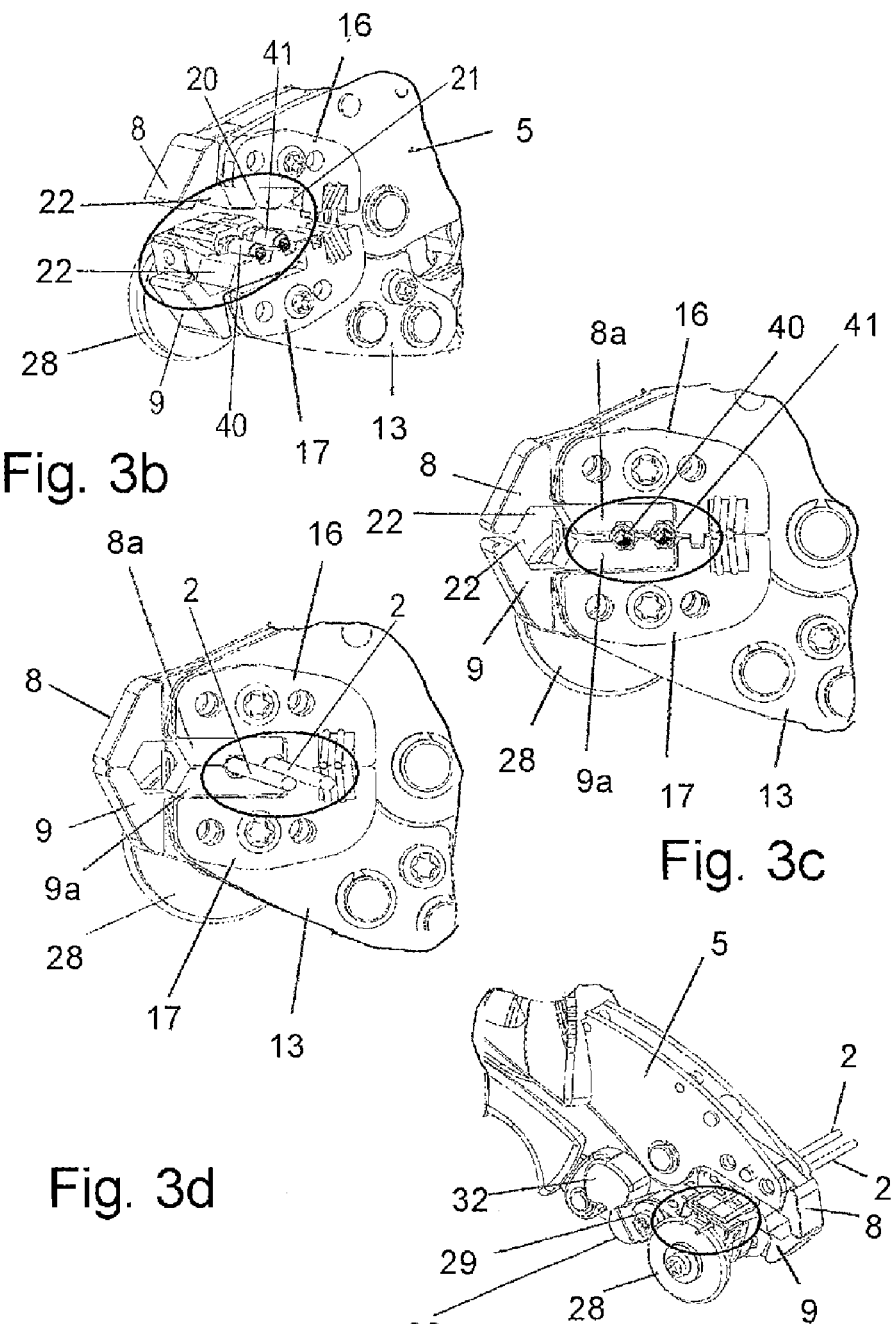

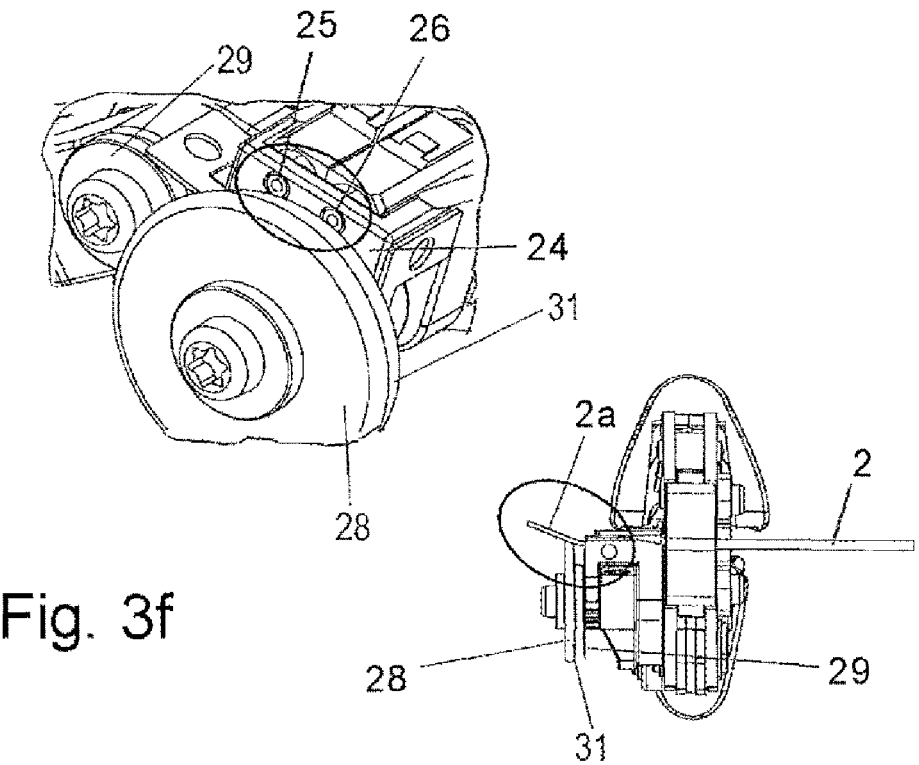
Fig. 3f
Fig. 3g
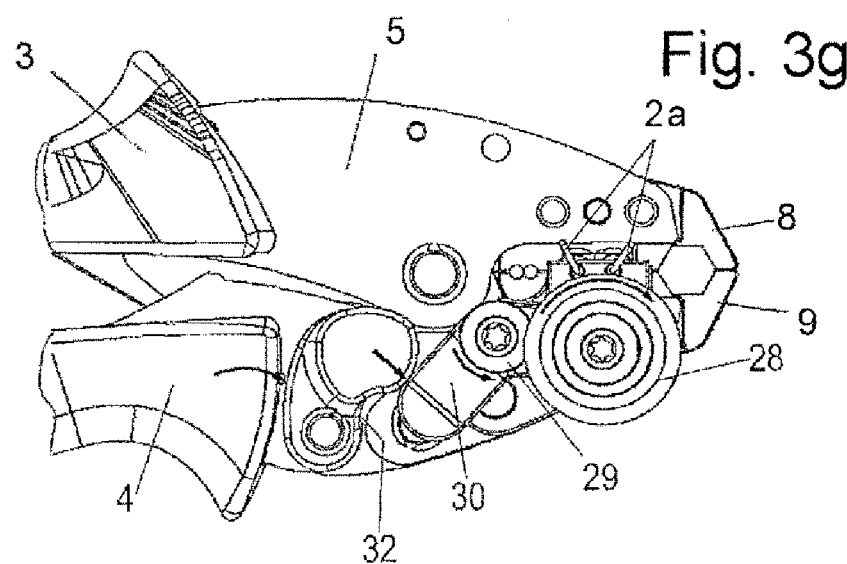
Fig. 3h

TOOL FOR PROCESSING LIGHT WAVE CONDUCTORS

BACKGROUND OF THE INVENTION

1. Field of the Invention

A hand tool is operable to crimp a tubular metal contact member concentrically about the stripped end portion of an insulated fiber optic light-wave conductor in spaced relation to the free end extremity thereof. A tensioning arrangement tensions and stresses the excess portion of the conductor that extends beyond the contact member, whereupon a cutting device engages the tensioned portion of the conductor to sever cleanly the excess extremity from the conductor.

2. Description of Related Art

This invention relates to a hand tool for the processing and final assembly of an insulated optical fiber light-wave conductor, including at least one crimping die for crimping a tubular contact upon the stripped bare end of at least one light-wave conductor, and mechanical transverse cutting means for severing off the excess length of the stripped bare conductor end.

Tools of this kind are known as such, for example, from DE 198 42 122 C2 or DE 100 56 780 A1.

The known tools, of course, require further optimization, on the one hand, regarding their handling and, on the other hand, regarding the quality of the cut needed for cutting through the light-wave conductors.

SUMMARY OF THE INVENTION

Accordingly, a primary object of the invention is to provide a hand tool for crimping a tubular metal contact member concentrically about the stripped end portion of an insulated fiber optic light-wave conductor in spaced relation to the free end extremity thereof. A tensioning arrangement stresses the excess portion of the conductor that extends beyond the contact member, whereupon a cutting device engages the stressed portion of the conductor to sever cleanly from the conductor the excess bare conductor end.

According to a more specific object of the invention, the tensioning arrangement serves to angularly deflect the conductor excess end portion relative to the longitudinal axis of the conductor. Tensioning is achieved by a deflecting disk positioned normal to the longitudinal axis of the light-wave conductor, or by a guide bore contained in a conductor guide device attached to the tool body. Preferably, two contact members are simultaneously crimped on a pair of conductors, and the excess ends of the conductors are simultaneously tensioned and severed.

Accordingly, the tool is characterized according to the invention by the provision of at lest one of the following functions:

(a) the mechanical transverse cutting devices are designed for adjusting the length of the light-wave optical conductors during or after the crimping of the light-wave conductor(s) during the same actuation movement with which the crimping is done, and/or (b) during the separation cut for cutting through the light-wave conductor, the mechanical transverse cutting device keeps at least one light-wave conductor under tension at an angle with respect to the longitudinal axis of the conductor in the plugs.

According to feature (a), the handling of the tool is definitely simplified. This is advantageous especially when the tool is designed as manual pincers because, in that way, one can do both the crimping and the separation of the conductor or the conductors with just one flick of the wrist. According to feature (b), the adjustment of the length of the light-wave conductor is performed in a particularly neat fashion because the pre-stress results in a particularly neat separation cut.

This separating cut, as a rule, is so good that there is no need for any further follow-up polishing of the cutting surface of the light-wave conductor, used in combination.

A particularly multi-functional hand tool is created when it has devices for the performance of the functions adjusting the length of the light-wave conductors, crimping the plugs or contact members on the light-wave conductors, cutting the light-wave conductors to the right length, and crimping a traction release on a housing to receive the plugs.

When constructed as a manually operable hand tool, the tool has two relatively mutually movable handle grips and one tool body, whereby the pincers head furthermore has two relatively mutually movable, in this case pivotable, processing jaws, which can be pivoted between opened and closed positions and which, during their interplay, form the handles, whereby in or on the crimping jaws, there are made tools as devices for the performance of one or several of the above-mentioned functions.

It is particularly desirable that the hand tool comprises two cross-cutting stripping knives, which are attached laterally upon the processing jaws and which have the corresponding cutting areas, because in that way, the cross-cutting function also, using the tool, is constructively advantageously integrated into the tool and the length adjustment can be performed without any problems.

BRIEF DESCRIPTION OF THE DRAWINGS

Other objects and advantages of the invention will become apparent from a study of the following specification, when viewed in the light of the accompanying drawing, in which:

FIG. 3b is a detailed perspective view illustrating the support of a pair of contact members prior to the crimping operation; FIGS. 3c and 3d are detailed perspective views illustrating the crimping to the contact members onto the light-wave conductors, FIGS. 3e-3h are detailed perspective views illustrating the operation of the cutting means of FIG. 1a; and FIG. 3i is a detailed perspective view of a final crimping step of the invention of FIG. 1a;

FIG. 6b is a sectional view of the cutting blade means of FIG. 6a;

FIG. 7a is a detailed front perspective view of the tool of FIG. 6a; and

FIG. 7b is sectional view of the light-wave conductor deflecting means of FIG. 7a.

DETAILED DESCRIPTION OF THE INVENTION

Figure 3A:
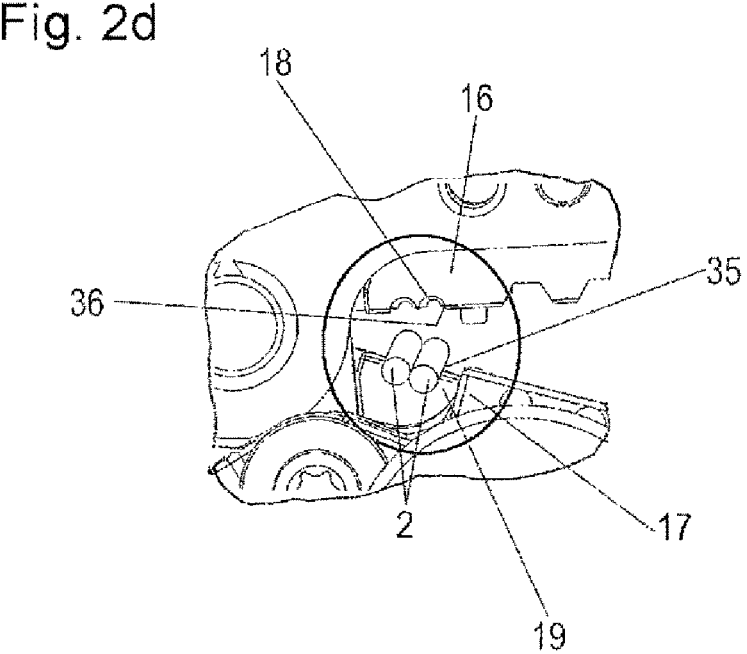
FIG. 3a is a detailed perspective view illustrating the operation of the stripping means of FIG. 1b.

Referring first more particularly to FIGS. 1a, 1b, and 2a-2c, the crimping and cutting tool 1 of the present invention includes a vertical sheet metal body portion 5 integrally connected with a first operating handle 3, and a second operating handle 4 pivotally connected with the tool body by a conventional toggle linkage arrangement including clamping toggle lever 13 that is connected by pivot shaft 11 with the tool body, toggle lever 12 that is secured to handle 4 and is pivotally connected with toggle lever 13 by pivot shaft 15 and an intermediate lever, and operating strut 14 that is pivotally connected between toggle lever 12 and the handle 3. Upper crimping jaw 8 is secured to the tool body 5, and lower crimping jaw 9 is connected with the clamping toggle arm 13. Consequently, when the handles 3 and are pivoted together, the crimping jaws 8 and 9 are brought together toward a crimping position (shown in FIG. 3d). The handles are provided with hand grip cover members 6 and 7, respectively.

Figure 1A:
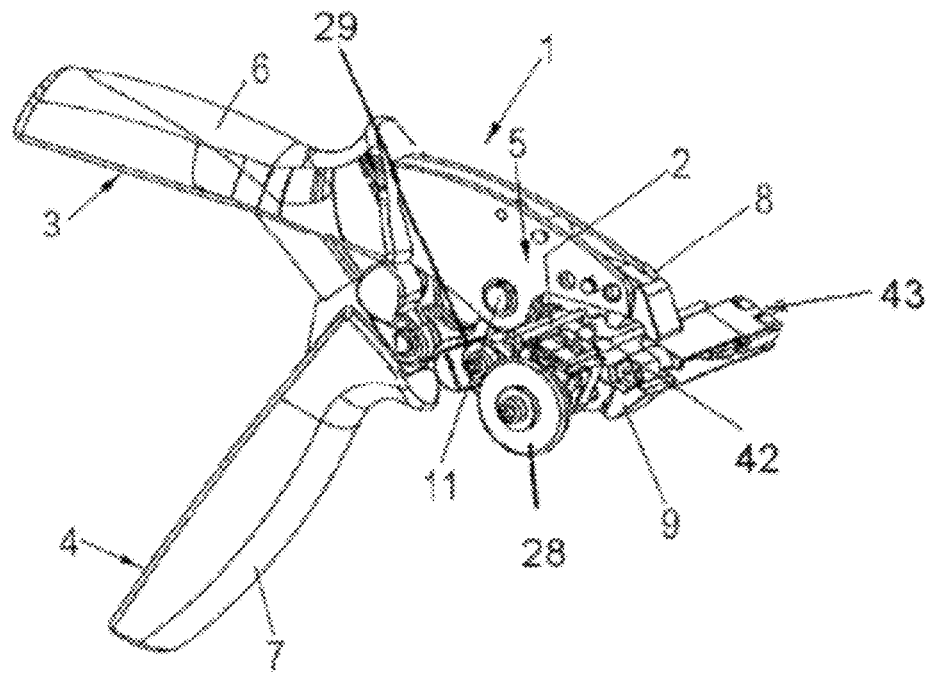
FIGS. 1a and 1b are front right-hand and left-hand perspective views of the crimping and cutting tool of the present invention.
Figure 1B:
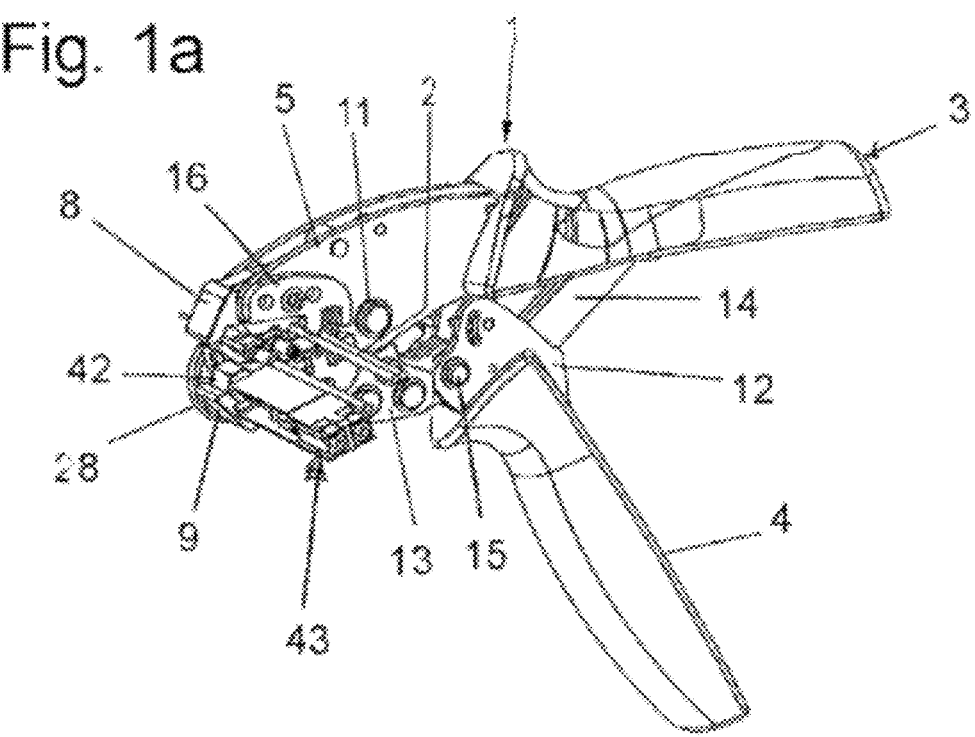
Figure 3I:
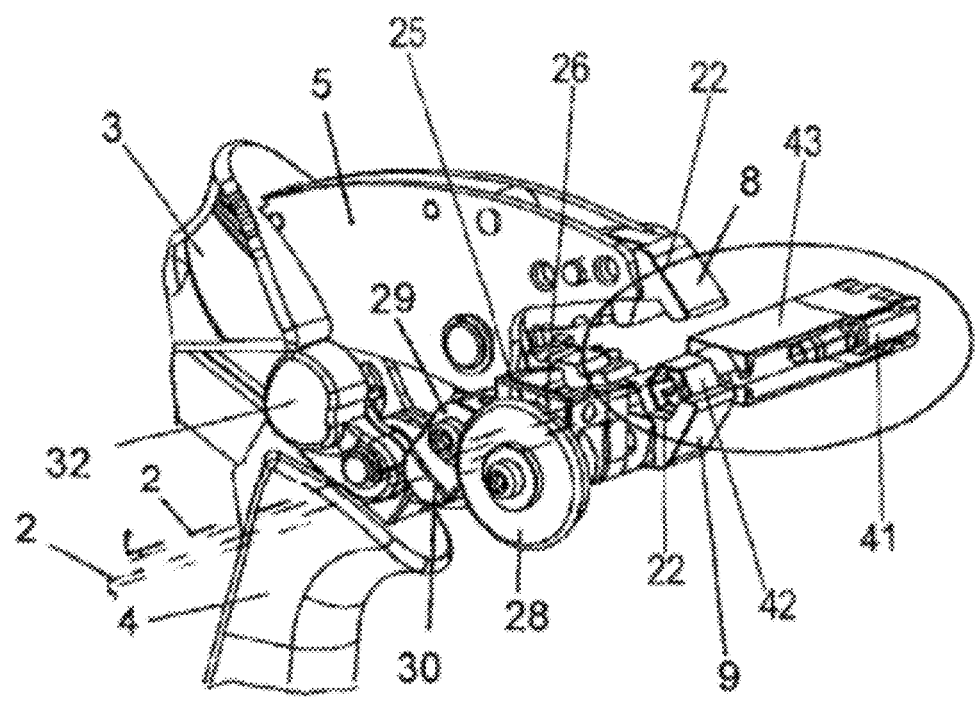

Fastened to the sides of the crimping jaws 8 and 9 are two knife-supporting plates 16 and 17 provided with transversely-arranged upper and lower stripping knives 18 and 19, respectively, which knives serve to strip the insulation layer from the insulated glass-fiber or polymer optical light-wave conductors 2, as will be described below. The adjacent faces of the crimping jaws contain cooperating opposed first crimping recesses and projections 20 and 21 that serve to crimp tubular metal contacts 40 and 41 (FIG. 3b) to the light-wave optical conductors 2, and with an opposed pair of second recesses 22 that serve to crimp the tension collar 42 (FIG. 3i) of a protective outer housing 43 to the pair of conductors 2, as shown in Figs. 1a, 1b, and 3i.

Fastened to the lower crimping jaw 9 is a horizontal contact member support tray 23 having a vertical rear stop wall 24 that contains a pair of through openings 25 and 26 (FIGS. 2c and 2d) adapted to receive the stripped bare end portions 2a of the insulated optical light-wave conductors. Opposite these openings is a deflecting disk 28 that is rotatably mounted on the horizontal shaft 33 that is bolted to the jaw 9. The deflecting disk 28 has a sloped edge portion 31 (FIG. 3g) that deflects the stripped end portions 2a of the optical conductors outwardly, as best shown in FIGS. 3g and 3h. A cutting arrangement 27 includes a circular knife 29 carried by a pivot lever 30 (FIG. 3h) for displacement by actuating lever 32 and handle 4 from a retracted position (Figs. 1a, 2c, 2d) toward a cutting position (FIGS. 3e and 3h) relative to the deflecting disk 28 and the contact member support means 23. During the pivotal displacement of lever 30 and circular knife 29 toward the cutting position, the knife is rotated by means of ratchet 37 (FIG. 2d) and first and second pawl means 38 and 44, respectively.

Operation

In operation, assume that two tubular metal contact members 40, 41 are to be crimped simultaneously onto two optical light-wave conductors 2, respectively, and then be enclosed in a protective metal housing 43 having a strain-relieving portion 42.

The outer insulation layers of the relatively delicate polymer or glass fiber optical fiber light-wave conductors 2 are stripped from the end portions 2a of the conductors by inserting the conductors on support recesses 35 and 36 (FIG. 3a) between the stripping knives 18 and 19, and by pivoting the handles 3 and 4 together to sever the insulation layers without any cutting engagement with the optical fiber conductors, whereupon the conductors are longitudinally displaced to strip the severed insulation layers from the bare conductor ends 2a.

Figure 2A:
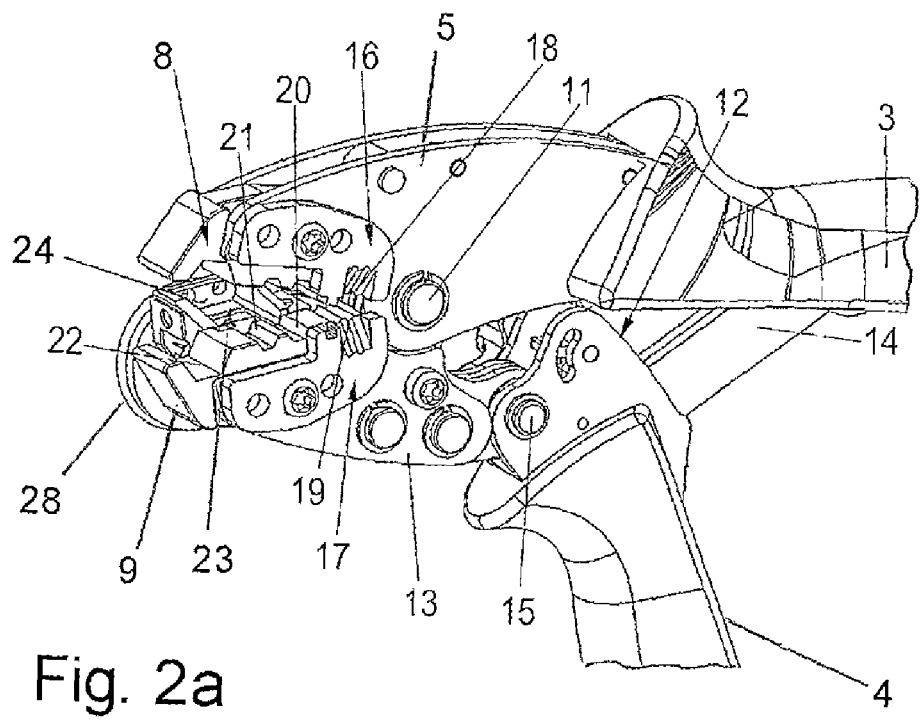
FIG. 2a is a detailed perspective view of the tool of FIG. 1b when in the open condition.
Figure 2B:
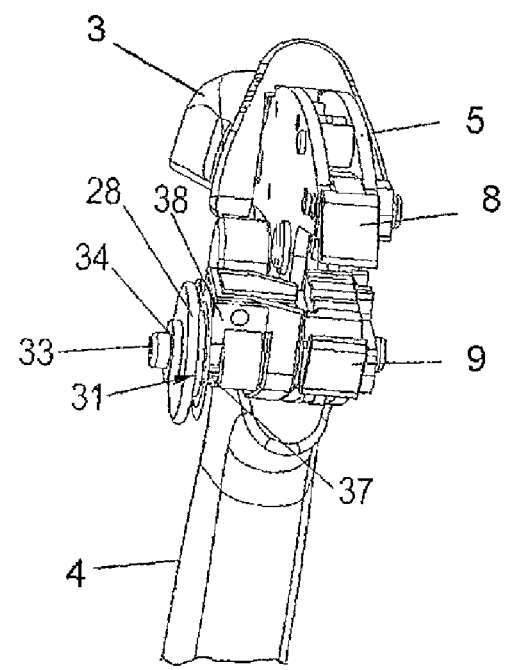
FIG. 2b is a detailed front perspective view of the front portion of the tool of FIG. 2a, FIG. 2c is a detailed view of the tool of FIG. 1a, and FIG. 2d is a corresponding view with certain parts removed for purpose of illustration.
Figure 2C:
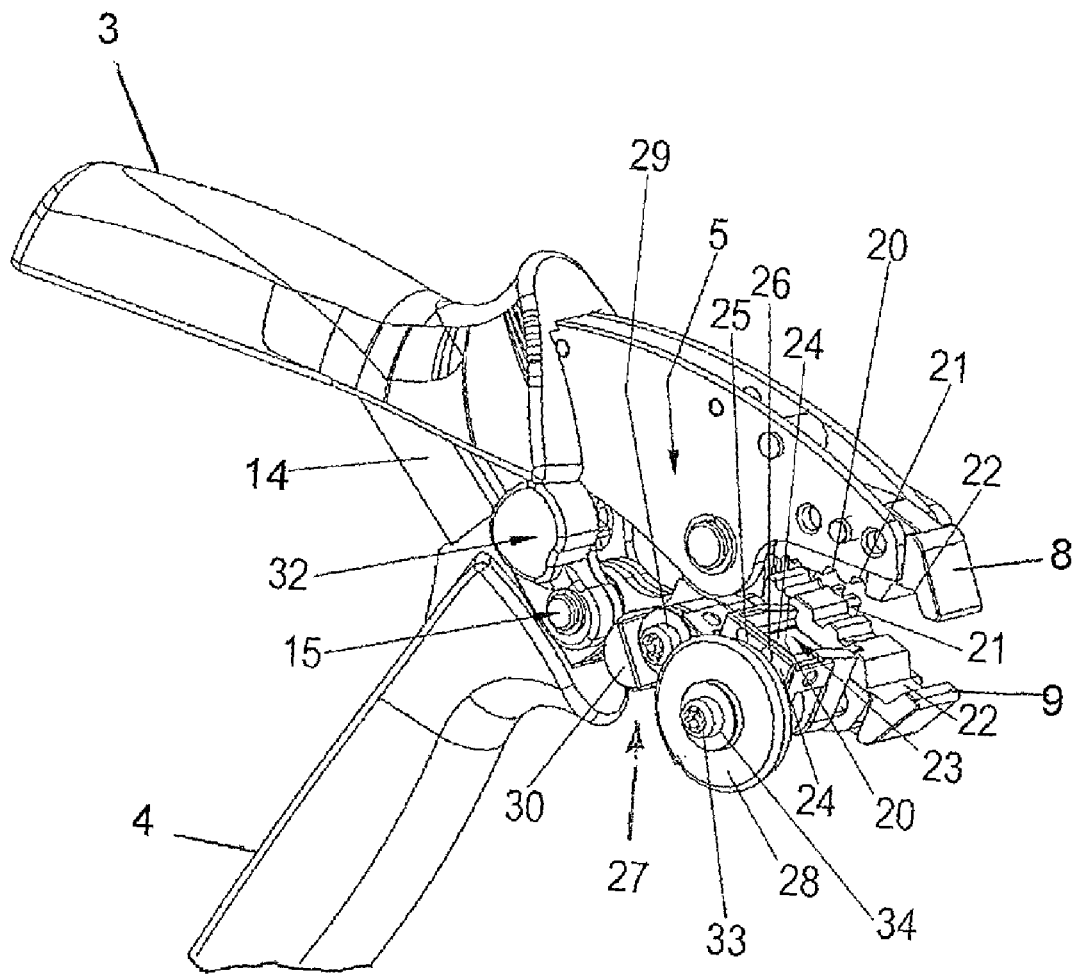
Figure 2D:
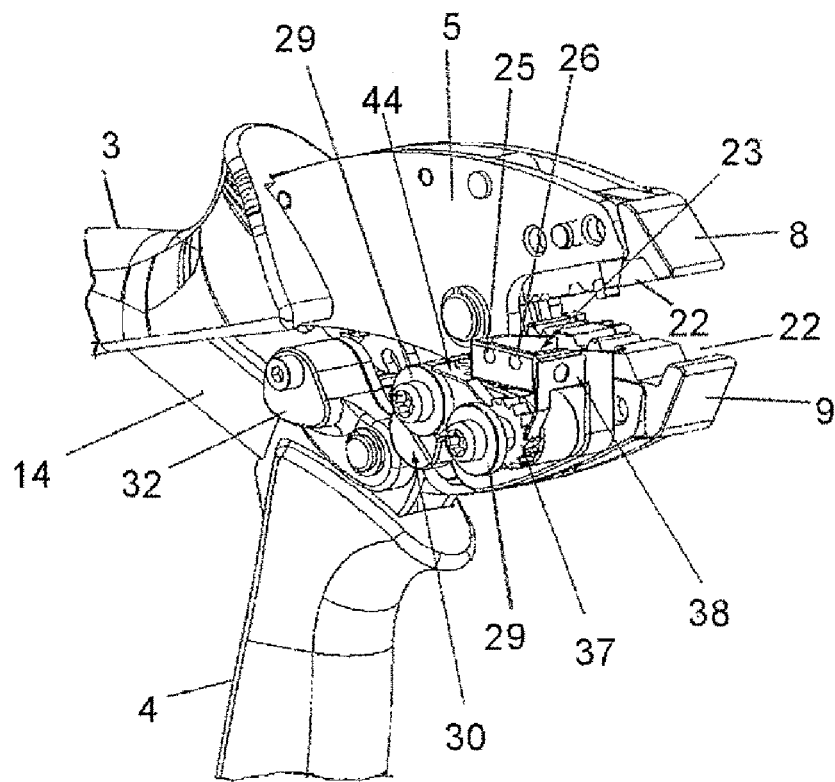

The tubular contact members 40 and 41 are then deposited on the support tray 23, with corresponding end portions of the contact members being arranged in the recesses of the crimping sets 20 and 21 (FIG. 3b). The bare stripped ends 2a of the optical conductor 2 are then inserted longitudinally into the contact members (FIG. 3d), with the excess ends of the bare conductors 2a extending from the openings 25 and 26 contained in the support tray stop wall 24 (FIGS. 3g and 3e). During this insertion step, the relatively delicate bare end portions 2a of the optical conductors are angularly deflected obliquely outwardly by the sloped surface 31 of the deflecting disk 28 (FIG. 3g), thereby to tension and stress the conductors adjacent the deflecting disk 28. The handles 3 and 4 are subsequently pivoted together to cause actuation lever 32 to pivot the cutting lever 30 toward the gap between the deflecting disk and the tray stop wall 24, with the cutting disk being rotated by the cooperation between the ratchet 37 and the pawls 38 and 44 (FIG. 2d). Owing to the tensioning of the stripped bare ends 2a of the conductors, the excess bare conductor end portions are cleanly severed by the circular knife 29, so that no further polishing of the cut end surfaces of the optical conductors is required.

The handles 3 and 4 are separated to open the crimping jaws 8 and 9, whereupon the protective metal sleeve 43 (Figs. 1a, 1b and 3i) is slipped over the the contact members. The traction relief portion 42 of the sleeve 43 is then inserted between the jaw recesses 22, as shown in Figs. 1a, 1b, and 3i, and the handles are squeezed together to crimp the traction relief portion 42 to the conductor assembly, whereupon the handles are opened to complete the assembly process.

The hand tool 1 is especially designed for the assembly of two insulated light-wave conductors 2 with one plug connection device, in particular, so-called POF (polymer optical fiber) duplex light-wave conductors and contact member connection devices. The assembly process using the hand tool of the present invention can be done in such a way that, as a rule, there will be no need for any subsequent polishing of the light-wave conductor cutting surface. For this purpose, the tool offers devices in the preferred embodiment shown in FIG. 1 for the performance of the functions of transverse-cutting and stripping the insulation layer of the POF light-wave conductors, crimping the contact members upon the POF light-wave conductors, severing the POF light-wave conductors to the right length, and crimping a traction relief sleeve upon the contact set. It should be noted that it is particularly advantageous to combine all of these functions in one tool. But in the context of this invention, it is not absolutely required that all of these functions be integrated in just one single manual pincers.

By closing the tool head/bit, the light-wave conductors 2 in the process are positioned and fixed in guides 35, 36 in the counter-die and in the bottom ram or in the processing cheeks in the correct place. It is not necessary to strip light-wave conductors of their jacket to a precise length because the final separation of the light-wave conductors 2 takes place only during the subsequent crimping step during which they are automatically cut to the right length.

This final severing of light-wave conductors 2 in this case is done advantageously during the same closing motion of the handles during which the crimping of the light-wave conductors ends also takes place.

During the insertion of the contact members toward engagement with stop wall 24, an elastically positioned end of the contact members plugs 40, 41 bumps against the circular knife 29 so that the tolerances of the individual parts of contact members s 40, 41 are balanced out, and contact members 40, 41 will lie almost without play upon circular knife 29. As indicated above, during the introduction of both POF light-wave conductors 2 into contact members 40, 41, the stripped light-wave conductor ends 2a engage an inclined surface 31 of the press-on disc 28 (FIG. 2b) and in this way slide along this slope 31 in such a way that the POF light-wave conductors are deflected in receiving area 23 relatively easily for the alignment of the longitudinal axis of the conductors in contact members 40, 41 (FIG. 3d). The deflection disk 28 lies along the prolongation of the longitudinal conductor axis in passage openings 25, 26 so that the light-wave conductors must be placed obliquely around that obstacle, something that causes a slight pre-stress, which thus definitely improves the cut image.

By bending or deflecting the light-wave conductor ends 2a, they are placed under stress, which during the subsequent severing separation of light-wave conductors 2 causes a protruding cutting surface that does not have to be subjected to any further polishing. The attenuation at the cutting site is already mostly reduced by the cut itself. The user in this way can easily cut the POF light-wave conductors 2 using the same closing motion that is used to crimp plugs 40, 41. The cut in the final analysis again runs at a right angle with respect to the light-wave conductor so that the light-wave conductor will close flush with the plug. To optimize the cutting surface on the light-wave conductors, circular knife 29 is made to rotate (see also FIG. 2c) This is done (FIG. 2d) by the pivotal motion of lever arm 30 of the ratchet gear 37 and of detent pawl 38 and a second detent pawl 44. The first detent pawl 38 is firmly connected with receiving area 23, ratchet gear 37 is firmly connected with knife 29, both of which being positioned together on an axis in a rotary fashion. If lever arm 30 is now actuated, the first detent pawl 38 will press upon the ratchet gear 37 and thus causes knife 29 to rotate. Detent pawl 44 prevents the ratchet gear 37 and thus also the circular knife 29 from turning backwardly, something that has the advantageous consequence that the knife is used during every cut at another site.

For traction relief purposes, crimp forging die 22 is made or arranged up front in the jaw pincers so that the preassembled unit with the components including contact members 40, 41, housing 43, cable traction relief sleeve 42 can easily be inserted into and removed from the crimp forging die 22.

Figure 4:
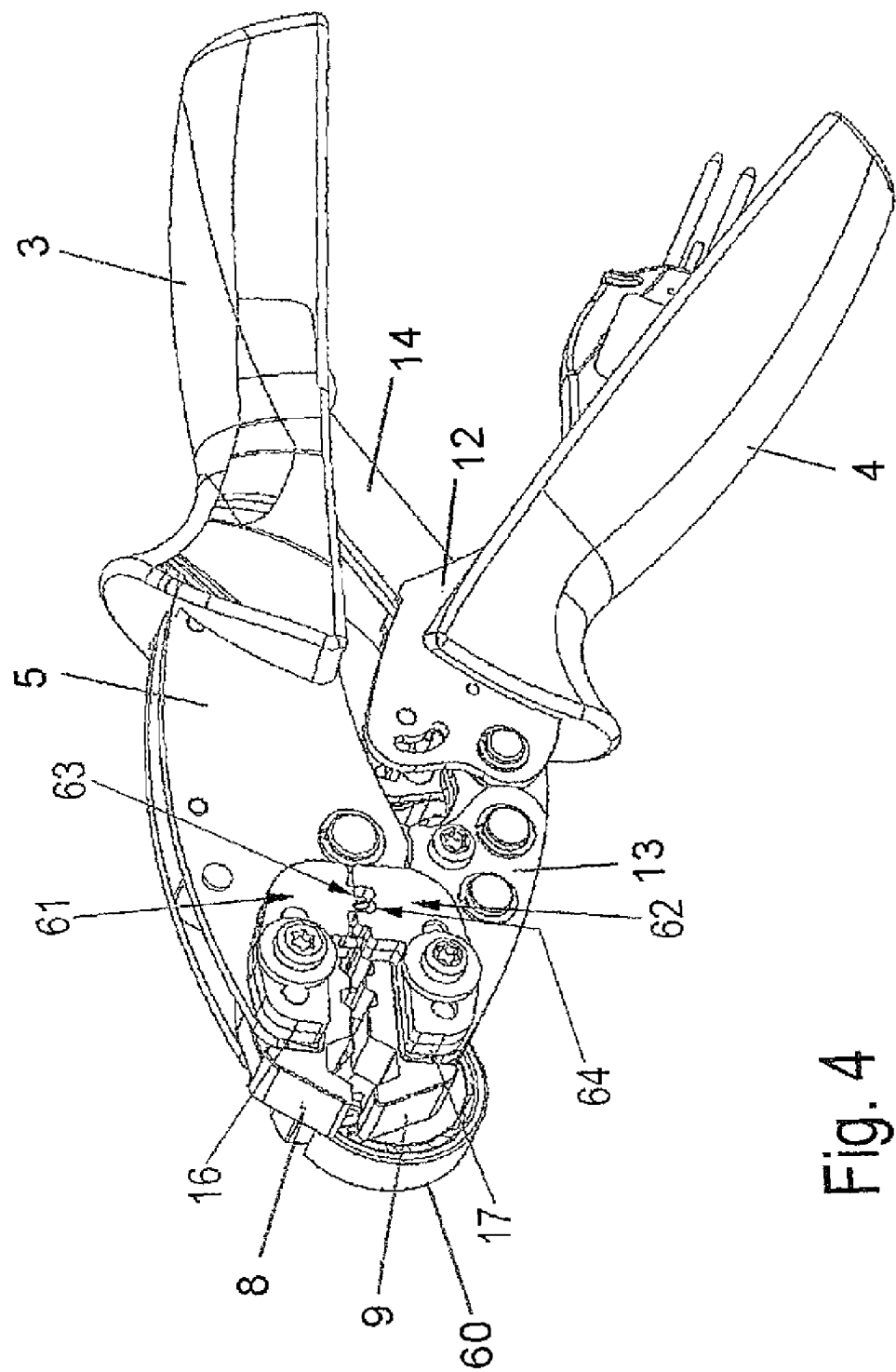
FIG. 4 is a perspective left hand view of a second embodiment of the crimping tool of the present invention.
Figure 5:
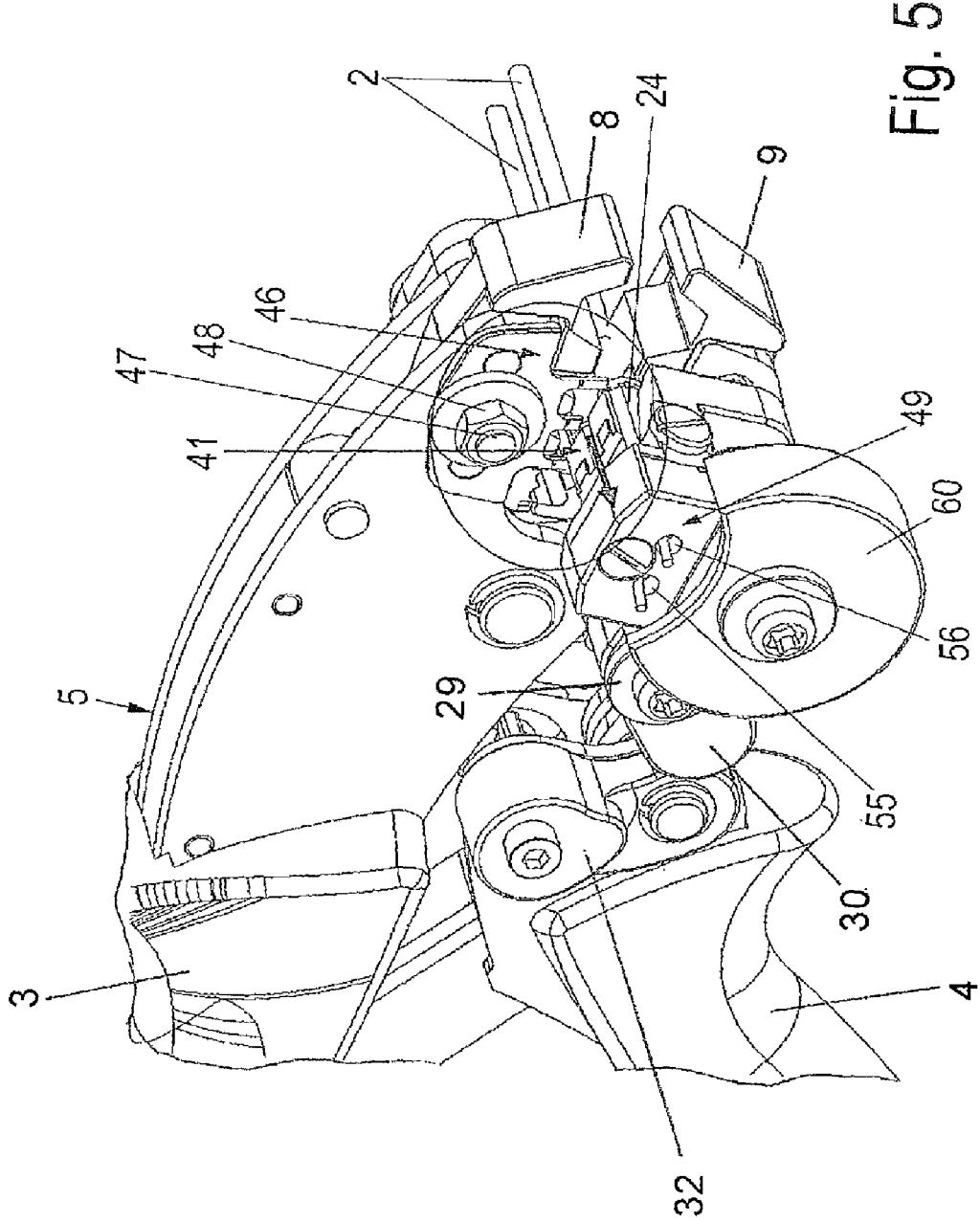
FIG. 5 is a detailed right-hand view of the tool of FIG. 4.
Figure 6A:
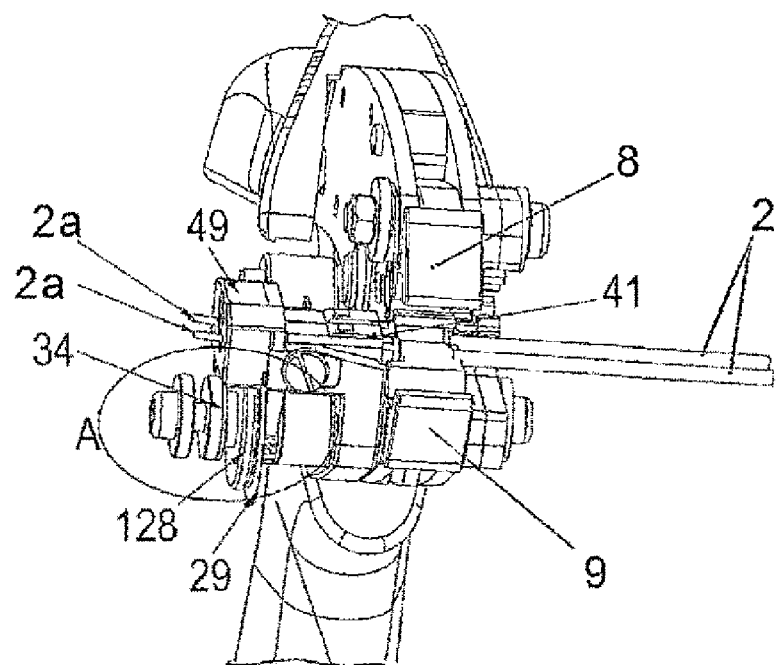
FIG. 6a is a front perspective view of the tool of FIG. 5.
Figure 6B:
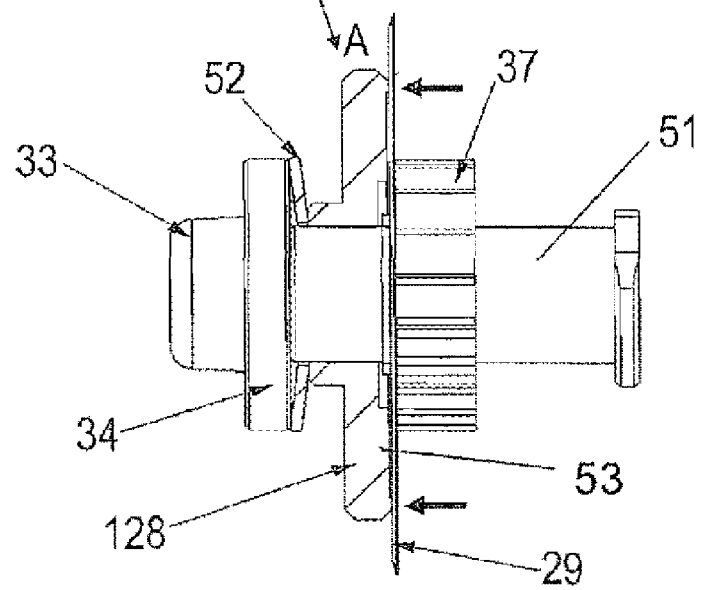
Figures 7A, 7B:
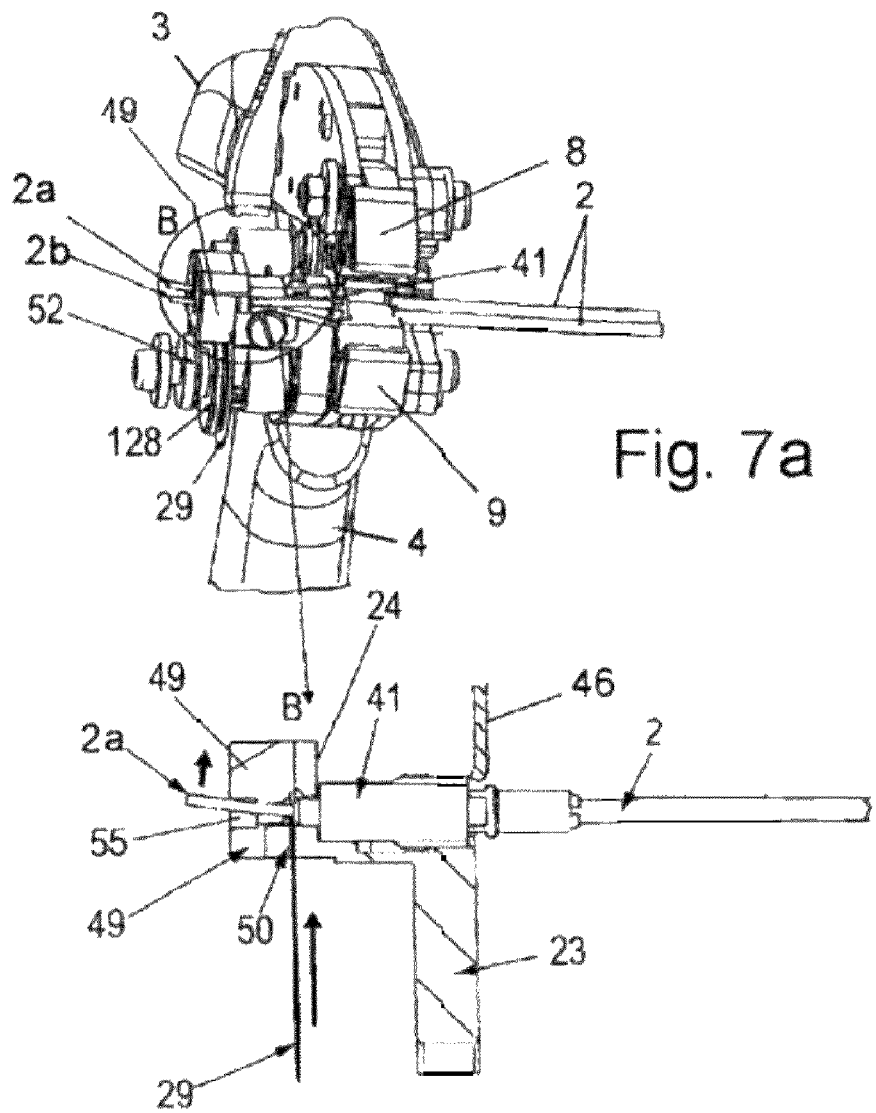

In the alternate embodiment of FIGS. 4 and 5, instead of using deflection disk 28 of the first embodiment discussed above, deflection of the bare conductor ends 2a is produced by deflection guide means 49 that are fastened to the stop end wall 24 of the contact member support tray 23. As best shown in FIG. 7b, the deflection guide means include through bores 55 and 56 (FIG. 5) that progressively widen such that the stripped bare conductor ends 2a are deflected obliquely angularly outwardly relative to the longitudinal axes of the conductors 2. The circular cutting blade 29 is displaced by operation of the handles 3 and 4 to extend into gap 50 adjacent stop wall 24, thereby to sever the stressed, tensioned portions of the bare conductor ends 2a During this displacement of the cutting blade, it is rotatably driven by the ratchet gear 37 secured to shaft 51 (FIG. 6). During the cutting operation of the optical conductor bare ends, the circular blade 29 is supported by the annular collar portion 53 of a support disk 128 that is biased toward the circular cutting blade by spring washer 52 which reacts with washer 34 mounted on bolt 33.

In order to support the outer circumferential surfaces of the optical conductors during the insulation-stripping step, a pair of guide plates 61 and 61 (FIG. 4) are fastened to the sides of the tool body 5 adjacent the stripping knives 16 and 17, which plates are proved with opposed support recesses 63 that receive and support the optical conductors. These guide plates 61, 62 are pressed against each other during the stripping action, except for recesses 63, 64 that form the passage openings for the light-wave conductors 2. Guide plates 61, 62 improve the cutting quality during the insulation step in that they prevent any damage to the actually light-conducting fibers of the light-wave conductor. Moreover, the manual force needed to extract the fibers is reduced and it is thus possible to prevent any damage to the fibers by the stripping knives 16, 17.

According to another feature, the contact members 41 and 42 seated on the support tray 53 are axially biased toward the stop wall 24 by leaf spring means 46 (FIGS. 5 and 7b), thereby to stabilize the contact members while the adjacent ends thereof are crimped to the bare conductor end portions 2a. The leaf spring is fastened to the tool by means of a screw 47 and a nut 48 and possibly a support disc. It is arranged on the side of the tool body 5 upon which is also arranged the transverse cutting mechanism 27 for adjusting the length of the light-wave conductors 2. Spring 46 is so designed and arranged that during the closing of the handles, it will press plugs 40, 41 in the direction of an abutment. Here this abutment is formed by stop 24. In this way, it is assured that the light-wave conductors will be cross-cut at the right axial point because contact members 41 are specifically made to rest against the abutment against which they are forced by spring 46. Spring 46 thus acts like an automatic positioning aid for contact members 41 (see also FIG. 6a).

FIG. 5 also shows a protective cover 60, especially for circular knife 29. According to FIGS. 6a and 6b, the transverse cutting mechanism 27 again has a circular knife 29, which is rotatably positioned and which can be driven and which, by virtue of its arrangement at the end of the pivotable lever arm 30 can be so moved along a circular arc segment that, using it, one can cut during or after the crimping of any as-yet-protruding ends 2a of the light-wave conductors 2. Lever arm 30 is swung as described in FIG. 3, illustrating the ratchet 37 and detent pawl 38 that turn or drive the circular knife. By virtue of its arrangement on lever arm 30, circular knife 29 can be swung into a gap area 50 (FIG. 7b) between seat 24 and guide means 49. Circular knife 29 rests directly against ratchet gear 37 and is connected to it in a non-rotatable manner. On its side opposite the crown gear 37, round knife 29 rests against a press-on disc 128. This press-on disc 128 preferably has a diameter that is only slightly smaller (preferably a maximum of 20% smaller) than the diameter of cutting knife 29.

Arranged between screw 33 and press-on disc 128 are preferably a washer 34 and a spring, in this case a spring washer 52. The spring is used to press the press-on disc 128 against the circular knife 29. The press-on disc 128 advantageously has an axial collar or shoulder 53, which is used as contact area with respect to cutting knife 29. In that way, the cutting knife is guided exactly in this area as a round knife 29 (FIG. 6b) and cannot slip during the cutting of the light-wave conductors 2.

FIGS. 7a and 7b show how the contact members 41 with the light-wave conductors rest in guides 49. Guide means 49 is placed upon the tool body 5, and preferably upon the lower crimping jaw 9, and it is attached or molded upon the latter. Cutting knife 29 can be moved with relation to the fixed guide 49. For example, between stop wall 24 of the receiving area 23 and guide means 49, there is preferably provided a gap 50 in which the cutting knife 29 can dip during the cutting process. Guide means 49 furthermore has a number of passage holes 55, 56 (or blind holes) corresponding with the number of the light-wave conductors 2 that are to be cut. Passage openings 55, 56 preferably are so fashioned that they will be somewhat wider in the direction toward the free ends of the light-wave conductors 2. In this way, the actual fiber of the light-wave conductors 2 is pushed somewhat obliquely upward by the circular knife 29 during the cutting procedure.

This slight oblique position prevents the uncontrolled snapping of light-wave conductor 2. This again facilitates a slight bend as a result of tension. The oblique position thus, however, is nevertheless so dimensioned that the actual cut will nevertheless run precisely normal with respect to the longitudinal axis of the conductor.

In describing preferred, exemplary embodiments, it might be noted that hereafter we describe some preferred embodiments also in detail, but that the invention is not confined to these embodiments but instead can be designed in any desired variations within the context of the claims. In particular, terms such as "above," "below," "in front" or "behind" must not be construed in any restrictive fashion but instead relate merely to the particularly illustrated arrangement. Moreover, when individual parts are explained, they—unless otherwise indicated—are also basically conceivable in multiple designs. The coverage furthermore also protects any functional reversals of the illustrated arrangements or procedures as well as equivalent designs.

While in accordance with the provisions of the Patent Statutes the preferred forms and embodiments of the invention have been illustrated and described, it will be apparent to those skilled in the art that changes may be made without deviating from the invention described above.

What is claimed is:

1. A hand tool for processing the stripped bare end of an insulated fiber optic light-wave conductor (2), comprising:
   (a) a tool body (5) having a generally horizontal axis;
   (b) a pair of crimping jaws (8, 9) connected with said tool body for crimping a tubular contact member (40, 41) arranged normal to said tool body axis concentrically about the stripped end of the light-wave conductor at a location spaced from the end extremity thereof, whereby an excess end portion (2a) of the light-wave conductor extends beyond the tubular contact member;
   (c) a support tray (23) connected with said crimping jaws, said support tray having a rear stop wall (24), said support tray being arranged to support the crimped contact member with the conductor excess bare end portion extending through an opening (25, 26) contained in said tray stop wall;
   (d) deflecting means (28; 49) for angularly deflecting said conductor excess end portion relative to the longitudinal axis of the contact member, thereby to tension the region of the light-wave conductor bare end portion that is adjacent the contact member; and
   (e) a cutting device (29) connected with said tool body and arranged between said deflecting means and said stop wall for engaging the tensioned conductor region and severing the excess bare end portion from the conductor.

2. A hand tool as defined in claim 1, wherein said cutting device is operable by said crimping jaws.

3. A hand tool as defined in claim 2, and further including a spring (46) for biasing the contact member toward said stop wall.

4. A hand tool as defined in claim 2, and further including:
   (f) a stripping arrangement (16, 17) connected with said tool body for stripping the insulation layer from the light-wave conductor end portion.

5. A hand tool as defined in claim 4, and further including conductor support means (61, 62, 63) for supporting the light-wave conductors during the stripping of the severed insulation layers from the bare conductor ends.

6. A hand tool as defined in claim 2, wherein said crimping means further includes a pair of handles (3, 4) for pivoting said crimping jaws between relatively spaced open positions and relatively closed crimping positions, respectively.

7. A hand tool as defined in claim 6, wherein the adjacent faces of said crimping jaws contain a plurality of pairs of opposed corresponding first crimping recesses and crimping projections (20, 21), respectively, thereby to permit the simultaneous crimping of a plurality of contact members upon a plurality of light-wave conductors, respectively.

8. A hand tool as defined in claim 7, wherein the adjacent faces of said crimping jaws contain opposed second crimping recesses (22), whereby when a hollow protective housing (43) is arranged concentrically about the contact members following the severing of the excess bare ends of the conductors, a tubular strain relief portion (42) of the housing may be arranged in said second crimping recesses for crimping by said jaws concentrically about the plurality of light wave conductors.

9. A hand tool as defined in claim 6, wherein said cutting device comprises a circular cutting disk (29) arranged adjacent said stop wall on the side thereof remote from said contact member support means, and a lever arrangement (30) operable by said handles for displacing said cutting disk between retracted and cutting positions relative to said light-wave conductor deflecting means.

10. A hand tool as defined in claim 9, and further including a drive arrangement (37, 38, 44) for rotating said cutting disk during its displacement toward said cutting position.

11. A hand tool as defined in claim 9, and further including a collinearly arranged support disk (128) having an annular collar portion (53) for laterally supporting said cutting disk.

12. A hand tool for processing the stripped bare end of an insulated fiber-optic light-wave conductor (2), comprising:
   (a) a tool body (5) having a generally horizontal axis;
   (b) a pair of crimping jaws (8, 9) pivotally connected with said tool body for crimping a tubular contact member (40, 41) arranged normal to said tool body axis concentrically about the stripped end of the light-wave conductor at a location spaced from the end extremity thereof, whereby an excess end portion (2a) of the light-wave conductor extends beyond the tubular contact member, the adjacent faces of said crimping jaws containing a plurality of pairs of opposed corresponding first crimping recesses and crimping projections (20, 21), respectively, thereby to permit the simultaneous crimping of a plurality of contact members upon a plurality of light-wave conductors, respectively;
   (c) a support tray (23) connected with said crimping jaws, said support tray having a rear stop wall (24), said support tray being arranged to support the crimped contact member with the conductor excess bare end portion extending through an opening (25, 26) contained in said tray stop wall;
   (d) deflecting means (28; 49) for angularly deflecting said conductor end portion relative to the longitudinal axis of said contact member, thereby to tension the region of the light-wave conductor excess bare end portion that is adjacent the contact member; and
   (e) a cutting device (29) connected with said tool body and arranged between said deflecting means and said stop wall for engaging the tensioned conductor region and severing the excess bare end portion from the conductor, said cutting means being operable by said crimping jaws;
   (f) said deflecting means comprising a circular deflecting disk (28) connected with said tool body for rotation about a horizontal axis normal to said tool body axis.

13. A hand tool as defined in claim 12, wherein said cutting device is arranged between said circular deflecting disk and said stop wall.

14. A hand tool for processing the stripped bare end of an insulated fiber-optic light-wave conductor (2), comprising:
   (a) a tool body (5) having a generally horizontal axis;
   (b) a pair of crimping jaws (8, 9) pivotally connected with said tool body for crimping a tubular contact member (40, 41) arranged normal to said tool body axis concentrically about the stripped end of the light-wave conductor at a location spaced from the end extremity thereof, whereby an excess end portion (2a) of the light-wave conductor extends beyond the tubular contact member, the adjacent faces of said crimping jaws containing a plurality of pairs of opposed corresponding first crimping recesses and crimping projections (20, 21), respectively, thereby to permit the simultaneous crimping of a plurality of contact members upon a plurality of light-wave conductors, respectively;
   (c) a support tray (23) connected with said crimping jaws, said support tray having a rear stop wall (24), said support tray being arranged to support the crimped contact member with the conductor excess bare end portion extending through an opening (25, 26) contained in said tray stop wall;
   (d) deflecting means (28; 49) for angularly deflecting said excess conductor end portion relative to the longitudinal axis of said contact member, thereby to tension the region of the light-wave conductor bare end portion that is adjacent said contact member; and
   (e) a cutting device (29) connected with said tool body and arranged between said stop wall and said deflecting means for engaging the tensioned conductor region and severing the excess bare end portion from the conductor, said cutting means being operable by said crimping jaws;
   (f) a conductor end guide arrangement (49) mounted on the side of said stop wall remote from said contact member support tray, said conductor end guide arrangement containing deflecting guide passages (55, 56) that guide the light wave conductor excess end portions angularly outwardly relative to the longitudinal axes of said light-wave conductors, respectively.

15. A hand tool as defined in claim 14, wherein said cutting device is arranged between said conductor end guide means and said stop wall.

\* \* \* \* \*